(12) United States Patent
Nachtigal (10) Patent No.: US 9,176,726 B2
(45) Date of Patent: Nov. 3, 2015

(54) METHOD AND APPARATUS FOR DEVELOPING, DISTRIBUTING AND EXECUTING APPLICATIONS

(71) Applicant: PapTap LTD, Rishon Letzion, IL (US)

(72) Inventor: Ira Nachtigal, Rishon Letzion (IL)

(73) Assignee: PAPTAP LTD, Rishon Letzion (IL)

(*) Notice: Subject to any disclaimer, the term of this patent is extended or adjusted under 35 U.S.C. 154(b) by 0 days.

(21) Appl. No.: 13/751,551

(22) Filed: Jan. 28, 2013

(65) Prior Publication Data

US 2014/0215451 A1    Jul. 31, 2014

(51) Int. Cl.
*G06F 9/44* (2006.01)
*G06F 9/445* (2006.01)

(52) U.S. Cl.
CPC .. *G06F 8/65* (2013.01); *G06F 8/61* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 6,496,979 B1 * | 12/2002 | Chen et al. | 717/178 |
| 8,261,231 B1 | 9/2012 | Hirsch et al. | |
| 2003/0071718 A1 * | 4/2003 | Kelly et al. | 340/10.1 |
| 2005/0257209 A1 * | 11/2005 | Adams et al. | 717/168 |
| 2006/0073785 A1 * | 4/2006 | Klassen et al. | 455/3.01 |
| 2006/0161646 A1 * | 7/2006 | Chene et al. | 709/223 |
| 2007/0277183 A1 * | 11/2007 | Muramatsu et al. | 719/319 |
| 2008/0040490 A1 * | 2/2008 | Karlberg | 709/228 |
| 2010/0233996 A1 * | 9/2010 | Herz et al. | 455/411 |
| 2011/0161912 A1 | 6/2011 | Eteminan et al. | |
| 2012/0244952 A1 * | 9/2012 | Patil | 463/42 |
| 2012/0254853 A1 * | 10/2012 | Aggarwal et al. | 717/173 |
| 2013/0132941 A1 * | 5/2013 | Lindeman et al. | 717/176 |
| 2014/0130035 A1 * | 5/2014 | Desai et al. | 717/172 |

FOREIGN PATENT DOCUMENTS

WO    2006/070071 A1    7/2006

* cited by examiner

*Primary Examiner* — Chameli Das
(74) *Attorney, Agent, or Firm* — The Law Office of Joseph L. Felber (57) ABSTRACT

A method, apparatus and computer program product for developing, distributing and executing applications are disclosed. A set of modules for use by one or more specific applications is stored in a local database on a mobile device. A specific application configuration, comprising a set of modules used by the specific application and a manner of usage thereof, is stored in the local database. Upon selection of a specific application by a user of the mobile device, a parent application is started with a parameter associated with the specific application. The parent application provides functionality of the specific application by activating the set of modules in accordance with the corresponding configuration, as retrieved from the local database.

14 Claims, 5 Drawing Sheets

METHOD AND APPARATUS FOR DEVELOPING, DISTRIBUTING AND EXECUTING APPLICATIONS

TECHNICAL FIELD

The present disclosure relates to applications for mobile devices in general, and to a method and apparatus for developing, distributing and executing applications on mobile devices, in particular.

BACKGROUND

In recent decades and particularly in recent years, electronic technology, including communication technology, has revolutionized our everyday lives. Portable electronic devices such as mobile phones, tablet computers, Personal Digital Assistants (PDAs), or the like, have permeated the lives of almost every person living in the developed world, and quite a number of people living in undeveloped countries. Mobile communication and computing devices, especially, have become the means by which countless millions conduct their personal, social, cultural, and professional interactions with the world. As part of this trend, a tremendous number of applications for mobile devices are developed, downloaded, and used by millions of people on a daily basis.

A typical application comprises a User Interface (UI) enabling a user to operate the application, for example enter data, receive results, or the like, a database for storing data related to the application, and one or more business logic modules (also referred to as "logic") for operating on the data in accordance with the user's instructions, including retrieving, modifying, storing, or deleting data.

In older architectures, sometimes referred to as "first generation", an application executed by a mobile device was a stand-alone application, in which all components, including the UI, logic and database were local and compatible with the device and its operating system. In such architectures, the application was not and did not have to be in any type of communication with a server platform during execution.

In some exemplary embodiments, while the application itself may be fully stored on and executed by the mobile device, it may contact an external source such as a server for obtaining updated data, such as weather data, stock quotes, or the like.

In more modern architectures, sometimes referred to as "generation1.5", the UI components resided on and were compatible with the mobile device, but the database and often also the business logic were provided by a web server, such that the application had to be in ongoing communication with the server for proper operation. In these architectures, the application communicated with a predetermined server, and proprietary data types may have been exchanged between the mobile device and the server.

In more modern architectures, supported for example by current "application stores", sometimes referred to as "second generation", the UI is still executed by the mobile device and the logic and database reside on a web server, but a single server can serve a multiplicity of UI types, each compatible with a mobile device or type of an operating system. This is similar to the classic web-based service architecture, wherein the main difference between the "second generation" and the "generation 1.5" architectures is that in the "second generation" each server can serve a multiplicity of different applications.

In all the above-mentioned architectures, the process of developing, distributing and executing applications suffers from three main problematic areas: developing the application, which requires design and programming stages; marketing and distributing the application; and updating the application and providing users with new versions without bothering the user.

Current solutions comprise application generation tools or environments, and continue by directing the developers to application stores or markets such as AppStore™ for distributing the application. The mobile device may be configured to contact the application store to check for updates for installed applications, and if any such update is found, the device overwrites the previous version with the updated one.

BRIEF SUMMARY

One exemplary embodiment of the disclosed subject matter is a computer-implemented method comprising: responsive to a user of a mobile device selecting a specific application, starting a parent application with a parameter associated with the specific application, wherein the parent application is configured to provide a functionality of the specific application; retrieving from a local database in the mobile device a configuration of the specific application, wherein the configuration comprises a set of modules used by the specific application and a manner of usage thereof; and activating the set of modules to provide the functionality of the specific application by the parent application. The method may further comprise responsive to available connectivity of the mobile device to a server, checking for updates for the local database associated with the specific application; and subject to the existence of an update, updating the local database, thereby modifying the functionality of the specific application at run time. Within the method, optionally based upon the configuration of the specific application, in response to an operation by the user interacting with a first module of the set of modules, activating a second module of the set of modules. Within the method, the parent application is optionally operative to provide the functionality of the specific application using one or more files stored locally on the mobile device, and wherein the method further comprises responsive to available connectivity of the mobile device to a server, updating the one or more files from the server.

Another exemplary embodiment of the disclosed subject matter is a computer-implemented method performed by a computerized device, comprising: responsive to activating a parent application, displaying to a user of a mobile device a collection of specific applications; receiving from a user an indication to a specific application; updating a database stored on the mobile device with information related to one or more modules used by the specific application, wherein the modules are pre-stored on the device; providing a data file associated with the specific application to the mobile device; and providing an activation shortcut to the specific application, wherein the activation shortcut is associated with a parameter, and wherein activating the activation shortcut activates the parent application with the parameter. The method may further comprise installing the parent application on the mobile device, comprising: installing an executable file of the parent application on the mobile device; establishing the database on the mobile device; and providing any of the modules to the mobile device. The method may further comprise updating the database stored on the mobile device when the specific application uses different modules. The method may further comprise updating the modules on the mobile device when a new version is available. The method may further comprise updating the data file associated with the specific application when a new version is available. Within the method each module may be selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customers module; a meeting scheduler module; a team management module; a meeting scheduler module; a sharing module; a bump module; a forum module; a customer reviews module; a push notification module; and a shopping module. Within the method, the information related to the modules used by the specific application may comprise specific configuration for ant of the modules to be used by the specific application.

Yet another exemplary embodiment of the disclosed subject matter is an apparatus comprising a processing unit and a storage device, comprising: a module storage comprising modules required for a specific application, to be downloaded to a mobile device; a specific application database comprising information related to one or more modules used by the specific application, to be downloaded to the mobile device; and a parent application to be downloaded to a mobile device, wherein the parent application is designed to activate on the mobile device one or more of the modules, to provide the functionality of a specific application. The apparatus may further comprise a mobile device comprising a second processing unit and a second storage device, the mobile device comprising: the parent application; a client specific application database comprising information related to any of the modules used by a specific application; and a client module storage comprising modules required for the specific application.

Yet another exemplary embodiment of the disclosed subject matter is a computer program product comprising: a non-transitory computer readable medium; a first program instruction for starting a parent application with a parameter associated with a specific application responsive to a user of a mobile device selecting a specific application, wherein the parent application is configured to provide a functionality of the specific application; a second program instruction for retrieving from a local database in the mobile device a configuration of the specific application, wherein the configuration comprises a set of modules used by the specific application and a manner of usage thereof; and a third program instruction for activating the set of modules to provide the functionality of the specific application by the parent application, wherein said first, second and third program instructions are stored on said non-transitory computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need for executing applications by a device such as a mobile device, whether the device is online or offline. In current technologies, if one or more of the required parts of the application, including but not limited to the user interface, the logic and the database in which the information is stored are not available on the device, then the application cannot be executed without communication with another device or server, such as a web server.

On the other hand, having all parts of an application available on the mobile device, may cause another technical problem which is dealt with by the disclosed subject matter: the need to update applications, as new versions become available. In current technologies, updated versions may or may not be suggested to a user by the application store, and even if an update is pushed to the mobile device, the user has to take the time and attention to download the updated application and install it, even for minor or almost meaningless changes.

Yet another technical problem dealt with by the disclosed subject matter relates to the need for fast development of applications. Development should use a set of predetermined tools, which are easy to use and manipulate on one hand, but provide flexibility on the other hand, to provide desired functionality and appearance.

One technical solution comprises a parent application which may be downloaded to and installed on a mobile device, and may attempt to communicate with a server when started. The application may provide a user with specific applications registered with the parent application. The parent application may display all registered specific applications, may provide classification of the registered specific applications, may provide searching capabilities within the registered specific applications, or the like.

Each such specific application may use during execution one or more modules, including but not limited to one or more User Interface Modules (UIMs), one or more Business Logic Modules (BLMs), modules related to a specific domain, or other modules, which may be provided, for example by a developer or a supplier of the parent application. The UIMs may contain, for example an HTML display module, a list display module, a table display module, a carousel display module, or others. The BLMs may include data processing modules, trade-related modules, social-network related modules, or others, for example as detailed below. In some embodiments, the specific application may contain no designated program code, but may rather be configured to use one or more of the UIMs or BLMs.

It may be that a BLM may influence one or more UIMs, for example when displaying data, or vice versa, for example in response to the user's activities. As an example, consider a UI module displaying a set of images in a graphical manner. The UI module may be activated using API to rotate, enlarge or otherwise. One BLM may be configured to manipulate the UI module in a certain manner (e.g., rotating all images as they are introduced) while another BLM may manipulate the UI, using the API, in a different manner.

In some exemplary embodiments, a specific application may contain general purpose code operative to execute modules based on configuration information, which may be retained in a configuration file, in a database, or the like.

It will be appreciated that any specific application may use any one or more modules, and may configure any of the modules in a specific manner. For example, a carousel display module that displays items in a carousel user-interface, may be configured by one application to display five (5) items, and by another application to display twenty (20) items, and the location from which the items to be displayed may also be indicated as a configurable parameter. Other examples may include configurable color, the content of the carousel, an icon which may be used to activate the module, or the like.

The provided modules may include but are not limited to modules such as the following:

an "about" module providing details about an entity, for example in the format of an electronic business card;
a menu module which may be useful in a restaurant or bar application;
a products and services module, which may be useful in displaying an electronic brochure or enabling window shopping;
a gallery module, which may be useful in displaying portfolios;
an events module, which may be useful in implementing event planner and scheduler as part of an application;
a calendar module, which may be useful in implementing calendar features as part of an application;
a chat module, which may be useful in implementing chats as part of an application;
a video chat module, which may be useful in implementing video chats as part of an application;
a sales and promotions module, which may be useful in featuring sales as part of an application;
an orders and delivery module, which may be useful in mailing items purchased through an application;
an order progress bar module, which may be useful in displaying the progress of an order made through an application;
a video gallery module, which may comprise video clips and enable operations such as playing, editing, sharing the clips, or the like;
a music gallery module, which may comprise audio clips and be useful in in many types of applications;
a friends module, which may be useful in managing contacts in many types of applications;
a delivery guide module, which may be useful in providing maps and instructions and may be useful in managing deliveries as part of commercial applications;
a customers module, which may be useful in managing customers in a wide variety of applications;
a meeting scheduler module, which may be useful in arranging meeting s between two or more people, and may be used in a wide variety of applications;
a team management module, which may be useful in managing players, representatives, or the like, and may be used in applications such as sports or other hobby-related applications;
a meeting scheduler module, which may be useful in arranging meeting s between two or more people, and may be used in a wide variety of applications;
a sharing module for sharing information with another user, or with friends in a social network, and may be used in a wide variety of applications;
a bump module for transferring a specific application to a mobile device that touches another mobile device that has this application installed;
a forum module for providing a forum functionality to an application;
a customer reviews module for enabling customers to express recommend, rank or otherwise state their opinion about a product;
a push notification module for implementing message playing by the mobile device; and
a shopping module which may be used for bank clearing or other payment mechanism, which may be used in a variety of applications.

It will be appreciated that the above module list is exemplary only and any other collection of modules may be used.

When the parent application is installed on a user mobile device, it may copy to the device the available modules, and establish on the device a database which will later, after one or more specific applications are installed, indications for each specific application installed on the device which modules it uses, for example which UIMs and BLMs it uses.

When a user using the parent application selects a specific application, information about the modules required for the specific application may be downloaded to the database established by the parent application which is stored on the mobile device. In some embodiments, during installation of the specific application, the modules used by the specific application may be verified to be present on the mobile device, or may be downloaded otherwise.

Additionally, data files associated with the specific application may be copied to the device during installation. The data files may be accessed by any of the modules. In addition, configurations associated with the specific application for one or more modules may be downloaded and may be stored in the database, as files, or in any other manner.

It will be appreciated that the term "installation" for the specific application is different than its common meaning, since no code or executable is copied to the mobile device. Rather, a database is updated with information related to the usage the specific application does with the modules, data files may be copies, and configurations may be stored.

Once the database is updated and all data files are available, the specific application may be executed on the user's mobile device in a stand-alone manner, similar to a first generation application, e.g., wherein the application's user interface, logic and database are all stored on the mobile device and no communication with an external server is required.

In some exemplary embodiments, when the user starts any of the specific applications for example by clicking on its icon, it may be the parent application, or a thread of the parent application that is being executed, optionally with a parameter associated with the specific application, for example a numeric or other identifier associated with the specific application.

When the parent application gains access to its server, it may update the mobile device database. The database may be updated with information indicating which modules (UIM and/or BLM) are used by the specific application. In some exemplary embodiments, the database may be updated with configuration information relating to each module, to the manner in which the modules are connected to one another (e.g., operating module X by interacting with module Y), or the like. In some exemplary embodiments, the database may be updated with respect to the specific application only or to all specific applications installed on the mobile device.

In some exemplary embodiments, additional files may be updated from the server, such as but not limited to files used by the modules in the operation of the specific application, as defined by its configuration. Additionally or alternatively, UIMs or BLMs may be updated if newer versions are available and optionally new available UIMs or BLMs may be downloaded to the mobile device.

Thus, the specific applications are being updated automatically without the user having to download and install an update for each specific application.

One technical effect of the disclosed subject matter is the option to execute applications by a device such as a mobile device, in the same manner whether the device is connected to the network or not. All required parts of the specific application are stored on the mobile device, and no communication with a server is required for operating the specific application.

Having all the modules required for an application on the mobile device enables all processing to be performed by the mobile device, and provides for hybrid operation of the application as it is executed on a mobile device with or without communication to a remote device.

Another technical effect of the disclosed subject matter is the automatic updating of applications without the application vendor having to push the data to the mobile device, and the user having to download and install the application.

Yet another technical effect of the disclosed subject matter is the relatively little effort required for developing new applications. Having relevant UIMs and BLMs, a new application may be developed almost effortlessly where only data and configurations have to be supplied. For example, if modules exist which provide solution for a multiplicity of applications associated with different restaurants, developing an application for yet another restaurant may be done with little effort.

Figure 1A:
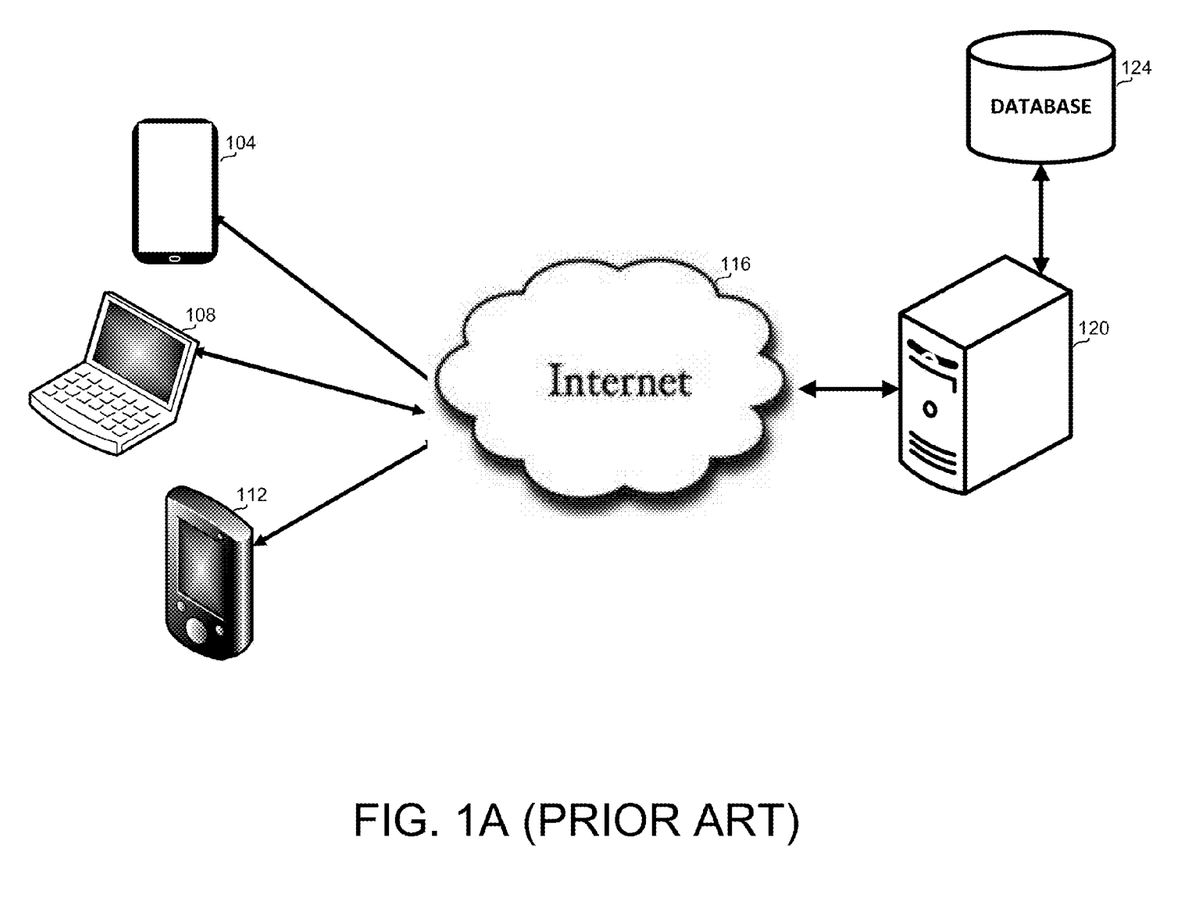
FIG. 1A is a schematic illustration of a prior art configuration of client-server environment.

Referring now to FIG. 1A, showing an exemplary prior art environment for downloading and executing applications.

The environment may comprise one or more mobile devices such as mobile phone 104, laptop computer 108 or Personal Digital Assistant 112, each connected to the Internet 116 by any wired or wireless connection. Each mobile device has downloaded thereto an application, such that only a small part of the application, for example the user interface is present and executed on the mobile device. The functionality of the application may be provided by a server-side application executed by server 120, optionally communicating with database 124 storing and retrieving information related to the application.

Thus, in prior art systems, the application can only function when there is live connection between mobile device and the server through the Internet. Even further, whenever there is a change in any of the application parts installed on the mobile device, these parts have to be downloaded and installed on the device.

Figure 1B:
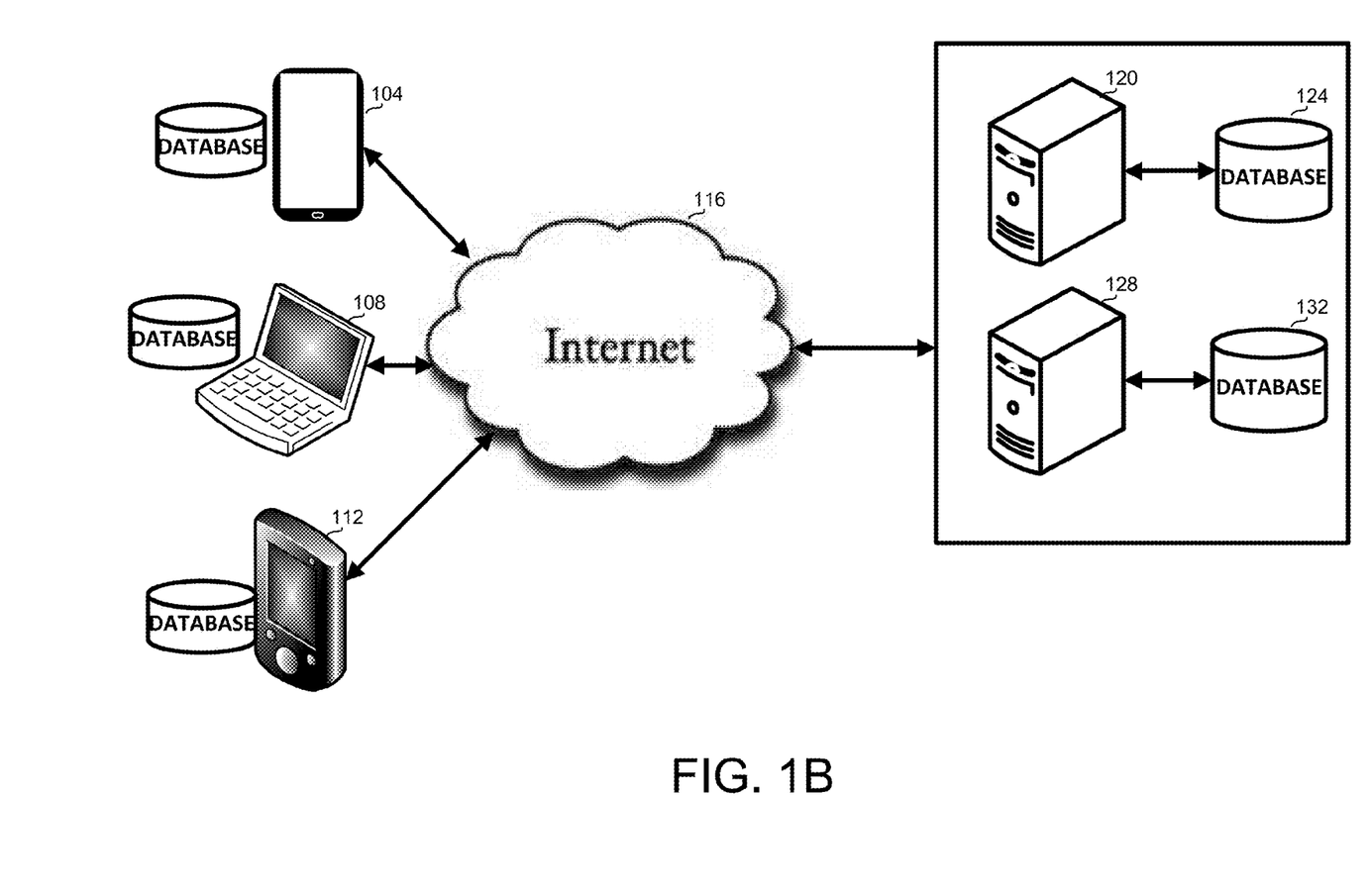
FIG. 1B is a schematic illustration of a configuration for distributing, executing and updating applications, in accordance with some exemplary embodiments of the disclosed subject matter.

Referring now to FIG. 1B, showing an exemplary environment for downloading and executing applications, in accordance with the disclosure.

The environment may comprise any one or more mobile devices such as mobile phone 104, laptop computer 108 or Personal Digital Assistant 112 disclosed in association with FIG. 1A above. Each such mobile device has installed thereon a parent application which may be used as a gateway for multiple specific applications. The parent application may provide for selecting specific applications, downloading all their relevant parts, and execution without requiring communication to a server. For executing the specific applications, each mobile device may comprise thereon the module collection and a database indicating which modules are required for each specific application, and optionally data files or configurations.

The parent application may communicate via a communication channel such as the Internet 116 with one or more servers such as servers 120 or 128, each optionally associated with a database such as 124 or 132, which may contain the data and configurations for one or more specific applications.

Thus, the parent application as installed on a mobile device may communicate with the servers in order to retrieve information about the modules required for a specific application, or retrieve the modules if a new version is available.

Figure 2A:
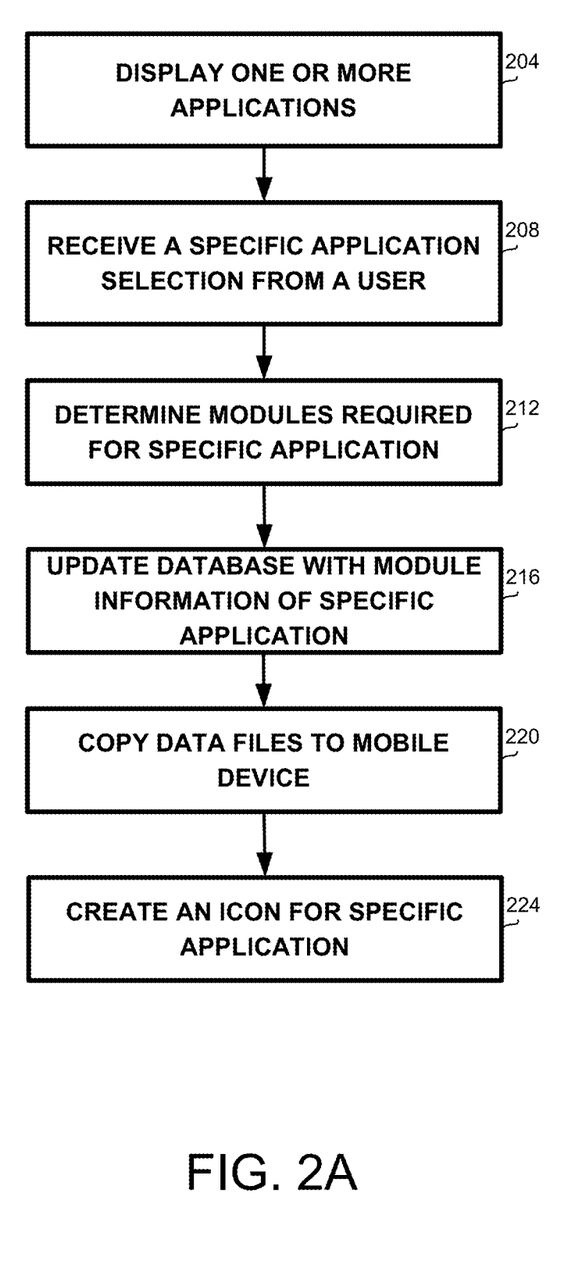
FIG. 2A is a flowchart diagram of a method for providing and installing applications, in accordance with some exemplary embodiments of the disclosed subject matter.

Referring now to FIG. 2A, showing a flowchart of steps in a method for providing and installing applications.

As a preliminary step, a parent application may be downloaded to a mobile device and installed thereon, similar to the installation of any application. The parent application may be a web-based application which communicates with a web server providing the information.

Installation of the parent application on the mobile device may comprise installing an executable file of the parent application on the mobile device, and establishing a local database on the mobile device, which may later indicate for each specific application the required modules. Installation may also comprise copying the most updated versions of each of the available modules to the mobile device.

On step 204, when the parent application starts, it may display to a user a list of specific applications as received from a server. The specific applications may be displayed as a hierarchy, categorized according to subjects, searchable, or in any other manner. The specific applications are applications which may be executed using BLMs and UIMs of the parent application.

On step 208, a selection of one or more specific applications may be received from a user.

On step 212, the parent application may determine, based for example on a remote database, which BLMs and UIMs are required for the specific application or applications selected by the user.

On step 216, the parent application may update the local database with the information related to the modules required for each of the specific application. For each module a set comprising one or more configuration parameters may be associated with the specific application, and may be stored within the database or on a separate storage.

On step 220, data files related to the specific application may be provided to the device, including for example pictures, HTML pages, text files, video files, audio files, or the like, which may be used by the modules such as the UIMs and BLMs for manipulating data associated with the specific application.

On step 224 an activation shortcut such as an icon may be created for the specific applications. In some embodiments, each such activation shortcut may be associated with a parameter such as a numeric or textual parameter. When the user activates the specific application, it may be the parent application that starts, wherein the parameter associated with the specific application being used as an argument for the parent application. Thus, icons of two or more specific applications may point to the same application, being the parent application, but with different arguments. However, it will be appreciated that the graphic icon of each such specific application may be unique and may differ from the graphic icon of the parent application, and may reflect or be associated with the specific application.

Figure 2B:
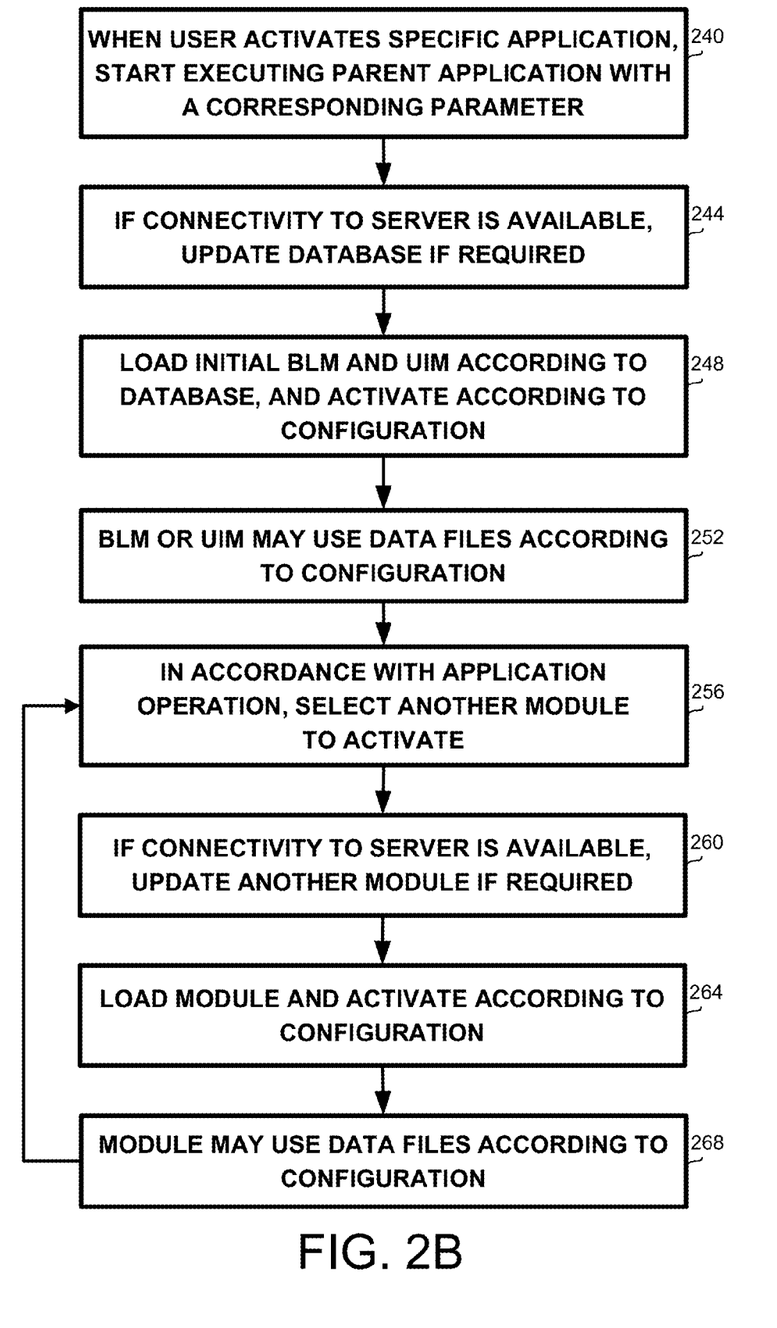
FIG. 2B is a flowchart diagram of a method for executing applications, in accordance with some exemplary embodiments of the disclosed subject matter.

Referring now to FIG. 2B, showing a flowchart of steps in a method for executing applications.

On step 240, responsive to the user activating a specific application, for example by selecting an icon associated with the specific application, the parent application is started with the corresponding parameter, associated with the specific application.

On step 244, the parent application may determine whether the mobile device has connectivity to the server. If it has, then the parent application may check whether there is an update to the specific application, for example a change in the collection of modules indicated as used by the specific application, and if there is such change, it may update the database. It may also check whether any of the used modules have changed, e.g., a newer version is available, and may update the version stored on the mobile device. The parent application may also update, if required, any of the data files associated with the specific application. In some exemplary embodiments, only the modules which are initially loaded for the specific applications and their associated data files may be updated.

On step 248, the parent application may retrieve from the database the specific BLM or UIM to be loaded for the specific application, and may load them into memory. The parent application may then activate any of the modules in accordance with the specific configurations as indicated for the specific application, for example in the database.

On step 256, in accordance with the operation of the specific application, for example responsive to actions by a user, a further module, such as another BLM or UIM may be selected to be activated. For example, in an electronic trade application, after a user selected an item and asked to proceed to checkout, a payment module may be selected.

On step 260, if the mobile device has connectivity to the server, the parent application may check whether an update exists for any of the new modules to be loaded or any of their associated data files and configurations, and may update them if required. Step 260 may enable updating the specific application on-the-fly even when Step 244 failed to update the database, such as in view of not having connectivity. In some exemplary embodiments, Step 260 may perform similar updates to those of Step 244 and not be limited to update only the new modules and theirs associated files and configurations.

On step 264 the new module may be loaded and activated in accordance with the specific configuration as may be obtained from the database.

On step 268 the new module may load data from an associated data file. The module may operate based on the configuration as appearing in the database.

Execution may then go back to step 256 and continue, where new modules may be selected and activated, for example in accordance with the user's activities.

Figure 3:
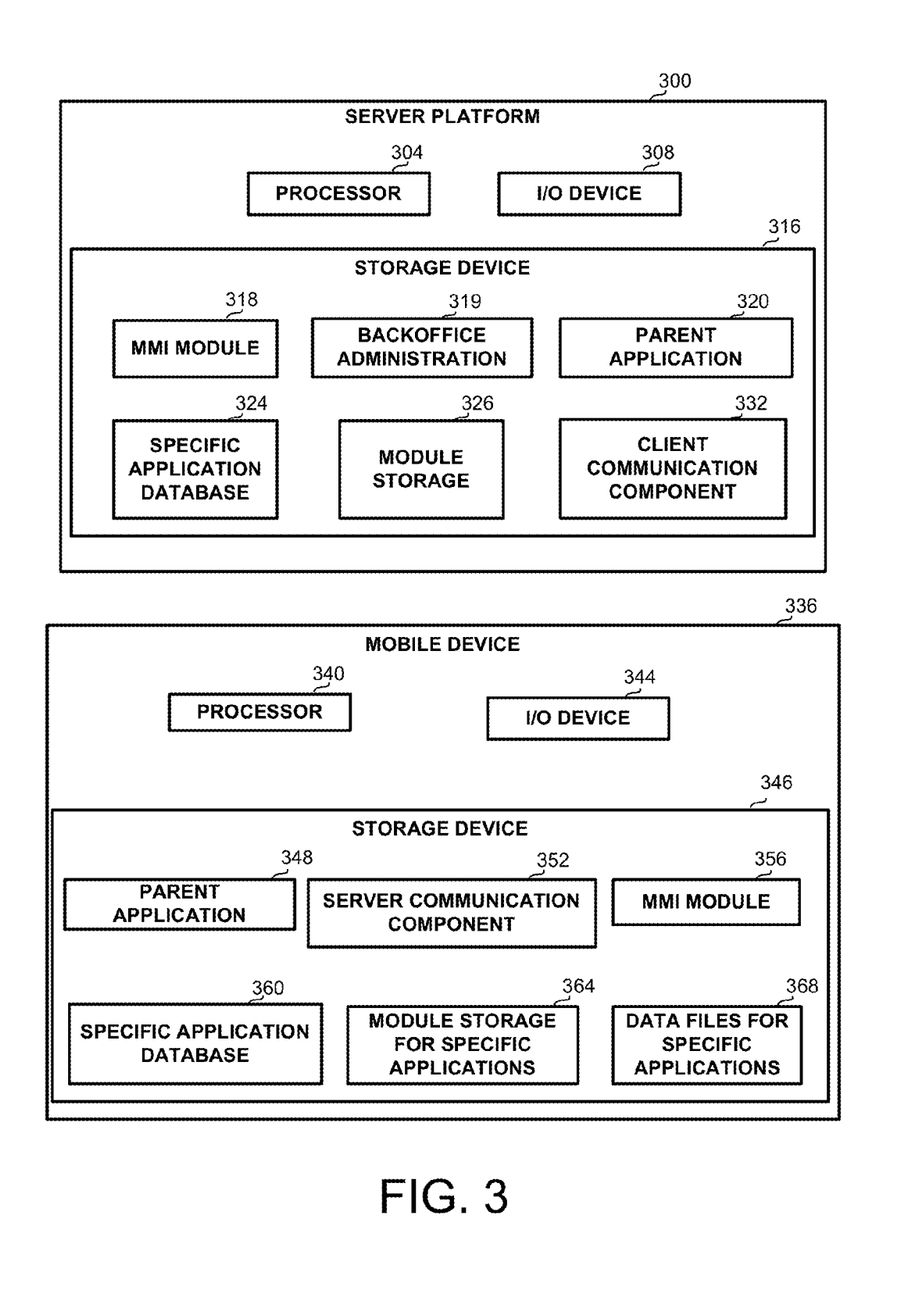
FIG. 3 shows a block diagram of an apparatus for providing and executing applications, in accordance with some exemplary embodiments of the disclosed subject matter.

Referring now to FIG. 3, showing a block diagram of a system for providing and executing applications.

The apparatus includes a server platform 300 which communicates with one or more mobile devices 336. Server platform 300 may represent any of the servers shown in FIG. 1B, such as server 120 or server 128.

In some exemplary embodiments, server 300 may comprise a processor 304. Processor 304 may be a Central Processing Unit (CPU), a microprocessor, an electronic circuit, an Integrated Circuit (IC) or the like. Alternatively, processor 304 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

Server 300 may further comprise I/O device 308 such as a display, a keyboard, a touch sensor, a mouse, an audio device, or the like, for a user to interact with the server device, generate events, provide commands, or the like.

In some exemplary embodiments, server 300 may comprise one or more storage devices such as storage device 316, for storing for example data related to applications, details related to one or more client devices or users, or the like. Storage device 316 may be persistent or volatile. For example, storage device 510 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like.

Storage device 316 may store or be loaded with a man-machine interface (MMI) module 318 which may be used by a user to provide input to the system or to receive output from the system via any of I/O devices 308. For example, MMI module 318 may be used for adding, deleting or changing information about specific applications to the server. It will be appreciated that in some embodiments, server 300 may be implemented without MMI module 318.

Storage device 316 may comprise backoffice administration component 319 for managing the configurations of specific applications, users, or the like. For example, backoffice administration component 319 may provide for monitoring the number of downloads of a specific application, billing, or the like.

Storage device 316 may store or be loaded with parent application 320, which is the application to be downloaded to the mobile devices.

Storage device 316 may store specific application database 324 comprising details relevant to each specific application, including for example identifying details, billing details, icon, or the like. In addition, specific application database 324 may also store for each specific application, indications such as identifiers of the UIMs and BLMs required by the application. Each new specific application registered with the parent application provides indications for the UIMs and BLMs it requires, and these indications are stored in database 324. Database 324 may further comprise configuration parameters or variables required for each module, or information related to interrelations between the modules in the context of the specific application, for example the parameters with which a particular module activates or calls another module.

Storage device 316 may comprise module storage 326, for storing the various the UIMs and BLMs required by any one or more of the applications.

Storage device 316 may store or be loaded with client communication component 332 for establishing communication with a mobile device for downloading the parent application, receiving requests for specific applications from the mobile devices, providing the modules, or the like. In some exemplary client communication component 332 may provide for checking whether the specific application database on a mobile device or any of the modules thereon needs updating, and may take care of the update.

Mobile device 336 may be any computing platform which may be carried by a user in the environment, such as a mobile phone, a smart phone, a tablet computer, a laptop computer, a Personal Digital Assistant, or the like.

Similarly to Server platform 300, mobile device 336 may comprise a processor 340, I/O device 344 and storage device 346 as described above in association with processor 304, I/O device 308 and storage device 316.

It will be appreciated that in addition to the components detailed below, client platform 136 may comprise all components relevant for its regular functionality, such as cellular communication system, Wi-Fi communication system, operating system, applications, or the like.

Storage device 346 may comprise or be loaded with parent application 348 downloaded from server 300 and installed on the mobile device.

Storage device 346 may comprise server communication component 352 for communicating with server platform 300, for example for establishing communication with server platform 300, receiving information about the modules required for a specific application, receiving database updates, module updates, data files updates, or the like.

Storage device 346 may comprise an MMI module 356 for receiving input from a user or providing output to the user, for example showing to the user a list of the available applications. MMI module 356 may also be adapted to be used when executing any of the specific applications, by using one or more of the UIMs required by the application.

Storage device 346 may have stored thereon specific application database 360 which may comprise information about the modules required for each of the specific applications installed on the device. Database 360 may be updated by parent application 348 when the mobile device is connected to the internet.

In addition, storage device 346 may contain module storage for specific applications 364, which contains the UIMs, BLMs or other modules as provided during installation of the parent application. In some exemplary embodiments, the modules may be implemented or stored as part of parent application 348.

Storage device 346 may further comprise data files for specific applications 368, such as image files, text files, HTML pages, or the like, or specific configurations for the modules.

In some exemplary embodiments, the parent application may be adapted to be executed by different operating systems, such as iOS™, Android™ or others, thus providing a uniform infrastructure for generating applications for different devices.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a wired network, a wireless network, a combination thereof, or the like.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   responsive to a user of a mobile device selecting a specific application for execution, executing an executable of a parent application with a parameter associated with the specific application, wherein the parent application is configured to provide a functionality of the specific application through a use of a set of modules, wherein the functionality of the specific application is provided by the executable of the parent application;
   in response to the executable of the parent application being executed with the parameter, the parent application retrieving from a local database in the mobile device a configuration of the specific application, wherein the configuration describes for the parent application a manner to provide the functionality of the specific application through a use of the set of modules, wherein said retrieving is performed using the parameter; and
   the parent application activating the set of modules to provide the functionality of the specific application by the parent application, whereby the functionality of the specific application is provided by the executable of the parent application and without using a separate executable for the specific application.

2. The computer-implemented method of claim 1, further comprising:
   responsive to available connectivity of the mobile device to a server, checking for updates for the local database associated with the specific application; and
   subject to the existence of an update, updating the local database, thereby modifying the functionality of the specific application at run time without modifying an executable.

3. The computer-implemented method of claim 1, wherein based upon the configuration of the specific application, in response to an operation by the user interacting with a first module of the set of modules, activating a second module of the set of modules.

4. The computer-implemented method of claim 1, wherein the parent application is operative to provide the functionality of the specific application using at least one file stored locally on the mobile device, and wherein the method further comprises responsive to available connectivity of the mobile device to a server, updating the at least one file from the server.

5. A computer-implemented method performed by a computerized device, comprising:
   responsive to activating a parent application, displaying to a user of a mobile device a collection of specific applications, wherein the parent application is able to provide a functionality of each specific application of the collection by utilizing one or more modules out of a set of modules, wherein the functionality of each specific application is provided by an executable of the parent application and without using a separate executable for the specific application;
   receiving from a user an indication to a specific application; and
   in response to the indication by the user, installing the specific application, wherein said installing comprises:
      updating a database stored on the mobile device with information related to at least one module used by the specific application, wherein the at least one module is pre-stored on the device and operable by the executable of the parent application;
      copying to the mobile device a data file associated with the specific application to the mobile device; and
      providing an activation shortcut to the specific application, wherein the activation shortcut is associated with a parameter identifying the specific application, and wherein activating the activation shortcut executes the executable of the parent application with the parameter, whereby the parent application provides the functionality of the specific application by retrieving the information from the database and operating the at least one module in accordance with the information, wherein the parent application is further configured to utilize the data file when providing the functionality of the specific application.

6. The computer-implemented method of claim 5, further comprising installing the parent application on the mobile device, comprising:
   installing the executable of the parent application on the mobile device;
   establishing the database on the mobile device; and
   providing the at least one module to the mobile device.

7. The computer-implemented method of claim 5, further comprising updating the database stored on the mobile device when the specific application uses different modules, whereby the specific application is updated without updating an executable.

8. The computer-implemented method of claim 5, further comprising updating the at least one module on the mobile device when a new version is available.

9. The computer-implemented method of claim 5, further comprising updating the data file associated with the specific application when a new version is available, whereby the specific application is updated without updating an executable.

10. The computer-implemented method of claim 5, wherein the at least one module is selected from the group consisting of: an "about" module; a menu module; a products and services module; a gallery module; an events module; a calendar module; a chat module; a video chat module; a sale and promotions module; an orders and delivery module; an order progress bar module; a video gallery module; a music gallery module; a friends module; a delivery guide module; a customers module; a meeting scheduler module; a team management module; a meeting scheduler module; a sharing module; a bump module; a forum module; a customer reviews module; a push notification module; and a shopping module.

11. The computer-implemented method of claim 5, wherein the information related to the at least one module used by the specific application comprises specific configuration for the at least one module to be used by the specific application.

12. An apparatus comprising a processing unit and a storage device, comprising:
- a module storage comprising modules required for at least one specific application, to be downloaded to a mobile device;
- a specific application database comprising a configuration of the specific application which comprises information related to at least one module used by the specific application, to be downloaded to the mobile device; and
- an executable of a parent application to be downloaded to a mobile device, wherein the parent application is designed to activate on the mobile device at least one of the modules, to provide the functionality of a specific application whereby the functionality of the specific application is provided by the executable of the parent application and without using a separate executable for the specific application, wherein the executable of the parent application, when being executed with a parameter, is configured to retrieve from a local database in the mobile device the configuration of the specific application, wherein the configuration describes for the parent application a manner to provide the functionality of the specific application through a use of the at least one of the modules, wherein the retrieval is performed using the parameter.

13. The apparatus of claim 12, further comprising a mobile device comprising a second processing unit and a second storage device, the mobile device comprising:
- the executable parent application;
- a client specific application database comprising information related to at least one module used by a specific application; and
- a client module storage comprising modules required for the specific application.

14. A computer program product comprising:
- a non-transitory computer readable medium, capable of tangibly embodying program instructions;
- a first program instruction for executing an executable of a parent application with a parameter associated with a specific application responsive to a user of a mobile device selecting a specific application, wherein the parent application is configured to provide a functionality of the specific application through a use of a set of modules, wherein the functionality of the specific application is provided by the executable of the parent application;
- a second program instruction for retrieving from a local database in the mobile device a configuration of the specific application in response to the execution of the executable of the parent application with the parameter, wherein the configuration describes for the parent application a manner to provide the functionality of the specific application through a use of the set of modules used by the specific application, wherein said retrieving is performed using the parameter; and
- a third program instruction for activating, by the parent application, the set of modules to provide the functionality of the specific application by the parent application, whereby the functionality of the specific application is provided by the executable of the parent application and without using a separate executable for the specific application, wherein said first, second and third program instructions are stored on said non-transitory computer readable medium.

* * * * *